United States Patent [19]

Zumbusch

[11] Patent Number: 4,819,923

[45] Date of Patent: Apr. 11, 1989

[54] GEARLESS INDEXING DEVICE

[76] Inventor: Peter C. Zumbusch, 110 Gordonhurst Ave., Upper Montclair, N.J. 07043

[21] Appl. No.: 54,844

[22] Filed: May 27, 1987

[51] Int. Cl.$^4$ .................................................. B23Q 1/04
[52] U.S. Cl. ......................................... 269/63; 269/71; 74/815
[58] Field of Search .............. 409/221, 222, 224, 227, 409/903; 408/71, 106, 122, 122.5; 51/216 A, 216 ND, 237; 279/1 DC; 33/174 TD, 174 S; 269/67, 69–70, 71, 73, 58–59, 61, 63; 74/815, 813 L, 813 C, 813 R

[56] References Cited

U.S. PATENT DOCUMENTS

| | | | |
|---|---|---|---|
| 1,200,638 | 10/1916 | Moor | 74/815 R |
| 3,063,155 | 11/1962 | Prefontaine | 74/815 |
| 3,074,298 | 1/1963 | Hardy | 74/815 |
| 4,502,457 | 3/1985 | Marron | 269/71 |

*Primary Examiner*—Robert C. Watson
*Attorney, Agent, or Firm*—Lerner, David, Littenberg, Krumholz & Mentlik

[57] ABSTRACT

A gearless indexing device for positioning and repositioning a workpiece to be machined in accordance with a desired system or predetermined program has a housing means, a bore end to end therethrough in which an actuating shaft is rotatably mounted. The workpiece is fixedly connected to one end of the actuating shaft and fixedly connected about the actuating shaft a spaced distance from the workpiece is an actuating assembly disposed for operative connection with the actuating shaft; the actuating assembly having, a suitable measuring device for establishing the predetermined measured distance for positioning and repositioning the workpiece, and a unique gearless transfer assembly for transmitting this measured distance to the actuating shaft and for rotating the actuating shaft serially in step by step arcuate distances each equivalent to the predetermined measured distance. A locking assembly is disposed for detachably, selectively and operatively connecting the gearless transfer assembly to the actuating shaft to serially move the actuating shaft an arcuate distance equivalent to said predetermined measured distance for positioning and repositioning the workpiece to be machined in accordance with the predetermined program.

22 Claims, 8 Drawing Sheets

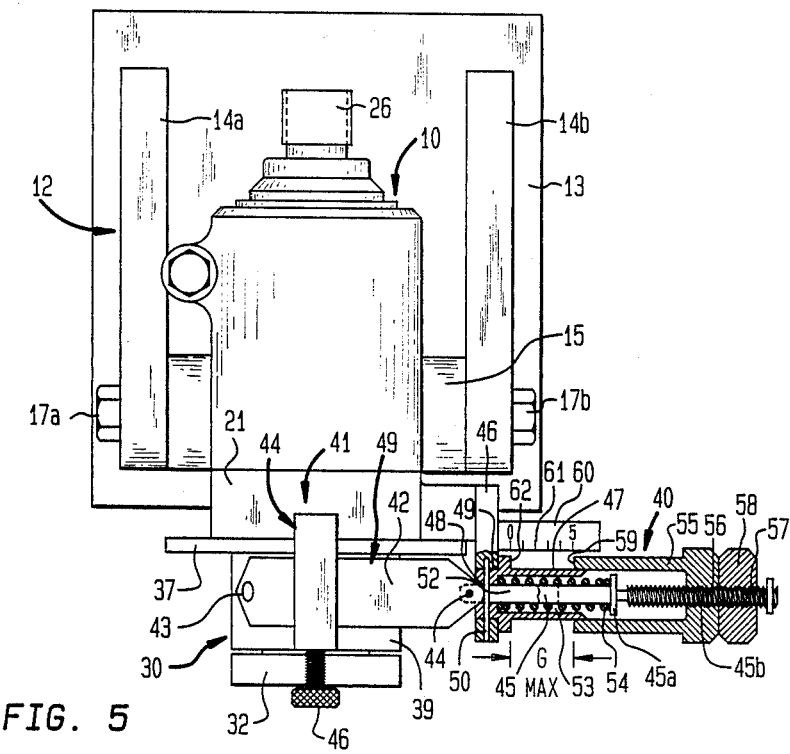
FIG. 5
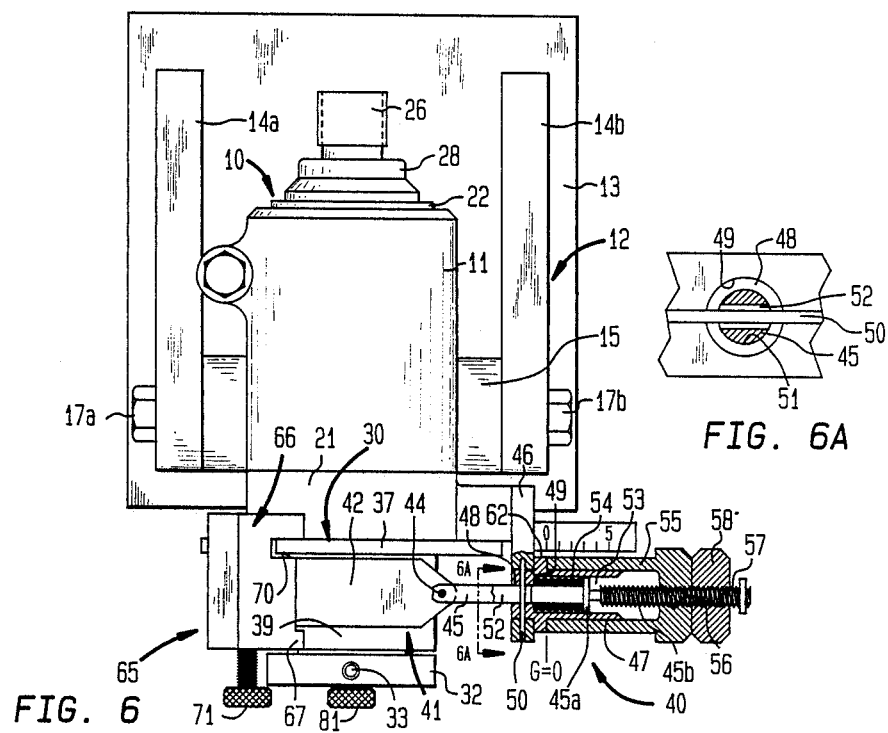
FIG. 6
FIG. 6A

GEARLESS INDEXING DEVICE

BACKGROUND OF THE INVENTION

This invention relates generally to a device for securing and positioning a workpiece during a machining process and more particularly to a gearless indexing device to simplify the accurate drilling of holes, and cutting of gear blanks, fluted reamers, and other components.

In the drilling of a component, or in the drilling, milling, grinding or cutting of the teeth on gear blanks, the flutes on reamer blanks and similar mechanical components, it is first necessary to accurately position and secure the workpiece to be machined in a suitable rotatable chuck, faceplate or like type holder. It is then further necessary to provide some suitable means for positioning and repositioning the workpiece by incremental steps so the required holes, gear teeth, flutes or the like can be cut into the workpiece by some suitable drilling, milling, grinding or cutting attachment which can be used for this purpose. The accurate positioning and repositioning of the workpiece for these processes is attained by serially or incrementally moving or rotating the workpiece a predetermined arcuate or angular distance from an initial zero position until the workpiece moves or rotates back to the zero position.

Dividing or indexing mechanisms for use in conjunction with lathes for milling and grinding gear blanks, fluted reamers, and similar mechanical components are known in the prior art. These for the most part are devices having a holder for the workpiece which coacts with mechanical gearing. Such prior art devices while accurate within their limitations as to size and number of indexing arrangements, are also expensive, and therefore are not readily available to small machine shops, hobby centers, or hobbyists who need to perform this type of machining operation.

Other less expensive forms of devices are also known but these present problems respecting their operation and reduction in accuracy as they wear.

Thus, for example, U.S. Pat. No. 1,200,638 illustrates a device which does not utilize mechanical gears. In U.S. Pat. No. 1,200,638 the workpiece, a gear blank, is shown as disposed in a holder which is also the dividing or indexing plate. In the repositioning of the gear blank after each tooth is cut, the holder must be rotated to permit a removable and replaceable pin to be aligned with the next incremental hole in the holder or indexing plate, to enable an associated turn buckle element to be so adjusted that the workpiece i.e. The gear blank will be rotated the required incremental arcuate or angular distance for cutting the next gear tooth. This device and its operation is not only limited in accuracy but is tedious and time consuming during the use thereof in order to achieve the desired movement within the capability of the device.

Although machine shops, big and small, have successfully employed devices similar to the above described device shown and disclosed in U.S. Pat. No. 1,200,638, the limitations inherent in such devices and the need for more accurate and simpler means for accomplishing the desired dividing and indexing for the drilling, milling, grinding or cutting of gears, reamers, and other mechanical components will be readily apparent to those skilled in the art.

The present invention seeks to meet this problem of the prior art by providing a dividing or indexing device which also eliminates mechanical gears and other complex combination of elements and seeks to meet the problems of the prior art by providing a relatively simple fitting and arrangement which is easy to manipulate and operate in the drilling, milling, grinding and cutting of gears, reamers, and the like mechanical component blanks.

In the present invention, the holder for the mechanical component, blank or workpiece to be machined is separated from the actuating means which coacts with and moves the holder and the workpiece mounted therein the desired incremental arcuate or angular steps required for a particular drilling, milling, grinding or cutting pattern or program by placing the holder on one end of a rotatable actuating shaft and operatively and selectively connecting an actuating means to the actuating shaft at a point spaced from the holder for the workpiece as is shown in the illustrated embodiments of the invention herein. The actuating means is operative to establish by suitable measuring means the required incremental distance for any given pattern or program and further includes associated elements which both transfer this measured distance and rotate the shaft in arcuate or angular increments equivalent to this measured distance so that the shaft, holder and the workpiece are simultaneously rotated to permit the desired drilling, milling, grinding or cutting operation to be performed on the workpiece.

SUMMARY OF THE INVENTION

Thus, the present invention covers a gearless indexing device for positioning and repositioning a workpiece to be machined in accordance with a predetermined machining program having, housing means, shaft means rotatably mounted in said housing means, chuck or other suitable holder means for the workpiece fixedly connected to and rotatably with the said shaft means, and an actuating means; for setting a predetermined measured distance in accordance with the required machining program for the workpiece; selectively and operatively connectible to the shaft means for serially rotating the shaft means an arcuate distance; equivalent to said predetermined measured distance; to enable the workpiece to be positioned and repositioned for the required machining program.

Additionally the gearless indexing device as above described in which the actuating means includes, means for setting the predetermined distance for positioning and repositioning the workpiece, gearless transfer means for receiving and converting the predetermined measured distance into an equivalent arcuate distance, and associated locking means operatively connected to the gearless transfer means and detachably and selectively connectible to the shaft means to serially rotate the shaft means an arcuate distance equivalent to the predetermined incremental distance for positioning and repositioning the workpiece to the machine.

Additionally, the gearless indexing device as first above described which includes; indexing means fixedly connected to the shaft means for rotating the shaft means, and wherein the actuating means includes; a measuring assembly for fixing predetermined measured distances, a gearless transfer assembly connected to the measuring assembly for receiving and converting the predetermined measured distance into an arcuate distance equivalent thereto; and locking means connected to the gearless transfer assembly and detachably and selectively connectible to the indexing means adapted in the locked position to rotate the gearless transfer assembly and to serially rotate the indexing means and the shaft means said arcuate distance, and in the unlocked position to permit the gearless transfer assembly to independently rotate back to its initial position while holding the indexing means at the indexed position, until the locking means is reset to again move the gearless transfer assembly and indexing means and the shaft means connected thereto the next arcuate distance equivalent to the predetermined measured distance set by the measuring assembly.

The gearless indexing device as above described including a base assembly on which the housing is pivotally connected to permit the workpiece to be positioned at a predetermined vertical angle to the cutting means.

The gearless indexing device as above described wherein the housing is mounted for relative rotation with respect to the base assembly to enable the workpiece to communicate with the cutting means at a predetermined horizontal angle.

Accordingly, it is an object of the present invention to provide a gearless indexing device for holding and accurately positioning a workpiece to be drilled, milled, ground or otherwise cut or worked which has a relatively simple structure and is easy to operate.

It is another object of the present invention to provide a gearless indexing device which resists mechanical wear and therefore will maintain a high degree of accuracy during normal usage.

It is another object of the present invention to provide a gearless indexing device having a shaft to which the workpiece is fixedly attached and rotatable therewith, and an actuating means also connected to the shaft, the actuating means includes, an adjustable measuring device for fixing predetermined linear distances, and associated coacting element, so the actuating means can rotate the shaft serially, from an initial zero position, predetermined arcuate, or angular distances by increments which correspond and are respectively proportional to the linear distance fixed by the adjustable measuring means.

It is yet another object of the present invention to provide a base assembly to permit movement thereof so the gearless indexing device pivotally connected thereto can adjust the workpiece to a predetermined vertical angle for engagement with the cutting means.

It is a still further object of the present invention to provide a gearless indexing device which is rotatably connected to a base assembly for adjusting the horizontal angle at which the workpiece is engaged by the cutting means.

These and other objects will become apparent, as will a better understanding of the structure and operation of the present invention, when reference is made to the description which follows taken with the drawings in which:

DESCRIPTION OF THE DRAWINGS

FIG. 5 is a top plan view of the gearless indexing device shown in FIG. 1 with the chuck for holding the workpiece removed and showing the micrometer type measuring assembly in horizontal cross-section and set at the maximum measuring span and the upper locking member set at the zero position before the shaft on which the workpiece is mounted has been rotated.

FIG. 6 is a top plan view of the gearless indexing device shown in FIGS. 1 and 5 with the chuck for holding the workpiece removed and showing the upper locking member rotated to the angular position equivalent to the measured span for the measuring assembly and further showing the micrometer type measuring assembly in horizontal cross-section moved to the zero position.

FIG. 6A is a view taken on line 6A—6A of FIG. 6.

DETAILED DESCRIPTION OF ONE PREFERRED EMBODIMENT

Figure 1:
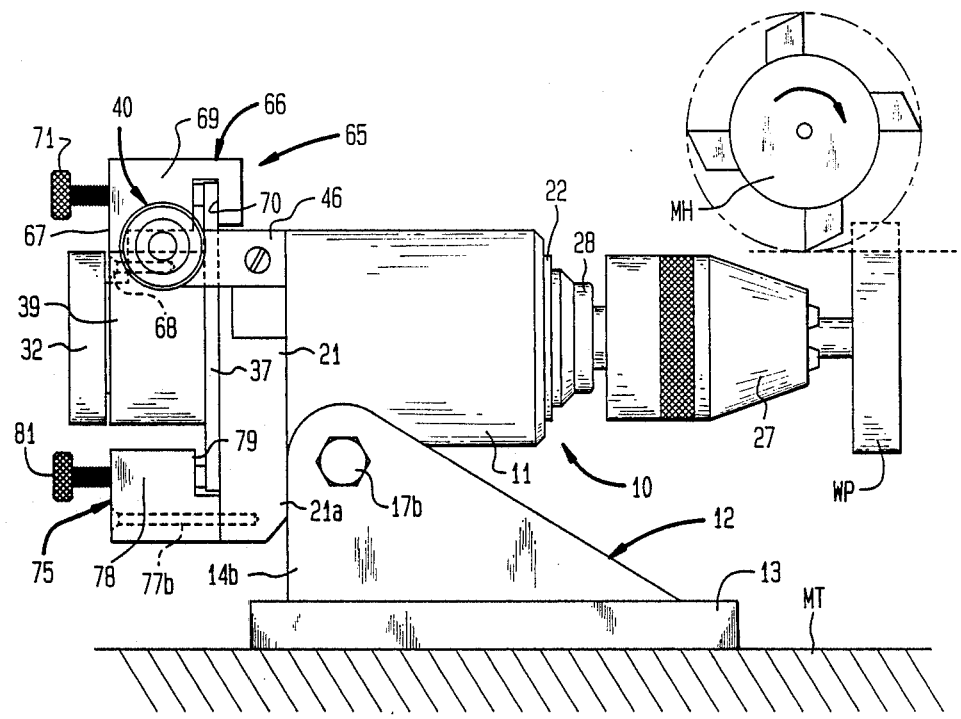
FIG. 1 is a right side elevational view of the preferred embodiment of a gearless indexing device in accordance with the present invention in assembled position on a machine table and holding a spur gear blank in position to be cut by a milling head.

Referring to the drawings, FIGS. 1 to 6A show one preferred form of the gearless indexing device generally designated 10 in accordance with the present invention.

Gearless indexing device 10 has a generally cylindrical outer housing 11 which is pivotally mounted on a base assembly 12. Base assembly 12 includes a horizontal flat plate member 13 and two spaced upright support members as at 14a and 14b connected generally normal to the flat plate member 13 by any suitable means. The support members 14a and 14b are triangularly shaped and are so connected that the apex of the respective triangular support members can receive the elongated boss member 15 on the housing 11 therebetween so that aligned openings as at 16a and 16b at the apex of the respective support members can receive threaded members 17a and 17b therethrough for engagement with corresponding aligned and threaded bores 18a and 18b in the respective opposite ends of the elongated boss 15 to provide means for pivoting the gearless indexing device 10 to the desired vertical angle for bringing a workpiece WP connected thereon into proper cutting engagement with a milling head MH, as is clearly shown in FIGS. 1 and 2 of the drawings.

Base assembly 12 is connected to a machining table MT by means of threaded member 19 so that the base assembly 12 is also rotatable about the axis of the threaded member 19, thus providing; means for rutating the gearless indexing device 10 to the desired horizontal angle for also adjusting the workpiece connected thereon to the proper cutting position.

In the use of the gearless indexing device the threaded members 17a and 17b are loosened and the gearless indexing device can then be pivoted to the desired vertical cutting position after which the threaded members are retightened and then the threaded member 19 can be loosened and the gearless indexing device rotated to the desired horizontal position and then threaded member 19 can be retightened. This procedure can be repeated until the workpiece is in the exact position for drilling the desired holes or cutting the gears, flutes or the like.

Figure 4:
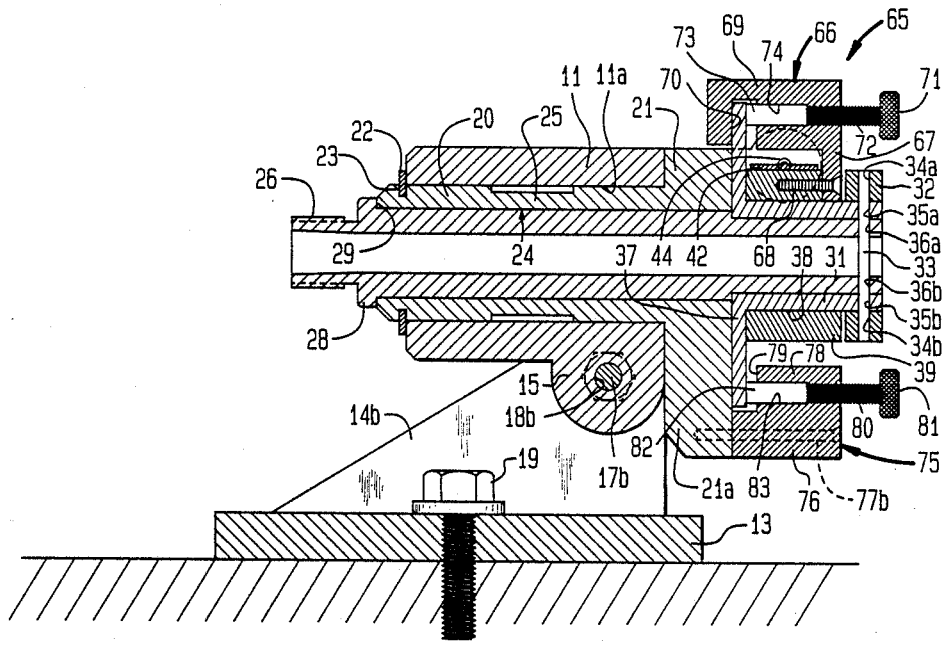
FIG. 4 is a cross-section taken on line 4—4 of the gearless indexing device shown in FIG. 3 with the chuck for holding the workpiece removed.

By reference to FIG. 4 outer housing 11 is shown as having an inner casing 20 mounted therein. Inner casing 20 has a length slightly greater than the length of the outer housing 11 and is so mounted in the longitudinal bore I ia in the outer housing that it extends along the longitudinal length thereof. In assembled position, a shaped end flange 21 at one end of the inner casing 20 will abut the end of the housing 11 remote from the end of the gearless indexing device 10 which holds the workpiece WP. The opposite end of the inner casing 20 extends beyond the end of the outer housing 11 adjacent the wokkpiece WP where a removable snap ring 22, disposed to engage a snap ring groove 23, acts to hold the inner casing 20 in assembled position in the outer housing.

Inner casing 20 is made of a suitable bearing material and has a bore 24 extending end to end therethrough in which actuating shaft 25 is mounted so that it can be rotated to serially move the workpiece WP through predetermined incremental angular or arcuate distances as will be more fully described hereinafter to enable the required holes, gears, flutes and the like to be drilled, milled, ground or cut in the blank defining the workpiece WP.

Shaft 25 is an elongated member so sized that in assembled position it extends beyond the opposite ends of the inner casing 20. One end of shaft 25 is provided with a standard threaded connector 26 on which any suitable type of chuck 27, or other holder for the workpiece to be drilled, cut or machined can be fixedly mounted for rotation with the actuating shaft 25. Chucks, face plates and other holders for gear blanks, reamers, or other workpieces are well known in the art and therefore will not be more fully described.

Inwardly of the standard threaded connector 26 the actuating shaft 25 is provided with an annular collar or flange 28 which defines a shoulder 29 disposed in assembled position in abutment with the associated end of the inner casing 20. At the opposite end actuating shaft 25 extends beyond the shaped flange 21 formed on the associated opposite end of the inner casing 20 for engagement with an indexing assembly and an actuating assembly respectively and generally designated 29 and 30. The indexing assembly 29 and actuating assembly 30 serve to hold the actuating shaft 25 in assembled position in the inner casing 20 and provide both the means for establishing the predetermined incremental angular or arcuate distances required for drilling, cutting or machining a given workpiece WP and the means for accurately moving the actuating shaft 25 serially these incremental angular or arcuate distances corresponding to the predetermined measured linear distances required for a given series or program of drilled holes, cuts or other types of machining to be made on the blank defined by the given workpiece in assembled position in the chuck 27 or other workpiece holder.

INDEXING ASSEMBLY

FIGS. 1 to 6A show that the indexing assembly 29 has an annular hub 31 and an annular shoulder 32. Annular shoulder 32 is disposed outboard of annular hub 31 and is fixedly connected about the end of the portion of the actuating shaft 25, projecting beyond the shaped end flange 21 and annular hub 31, by means of a transverse cross pin 33 which extends through aligned openings as at 34a and 34b in the annular shoulder 32, 35a and 35b in the outboard end of the annular hub 31, and 36a and 36b in the actuating shaft 25.

Connected to the inboard end of the annular hub 31 adjacent to the shaped end flange 21 is a radially extending flange or indexing disk 37. The radially extending flange or indexing disk 37 is the element which will be rotated through the predetermined incremental annular or arcuate distances by the actuating assembly 30 and an operatively associated double acting locking assembly generally designated 65 and more fully described hereinafter. Since the indexing disk 37 is fixedly connected to the annular hub 31 rotation of the indexing disk 37 and annular hub 31 will in turn rotate the actuating shaft 25 these same incremental angular or arcuate distances, all of which is shown in FIGS. 1, 2, 4, 5 and 6 of the drawings.

FIGS. 1, 2, 3 and 4 further show the radially extending flange or indexing disk 37 will have a diameter greater than the diameter of the outer housing 11 so that in assembled position a substantial circumferential portion of the indexing disk 37 is disposed to extend beyond the outer periphery of the shaped upper portion of the end flange 21 while a relatively smaller circumferential portion of the indexing disk 37 is disposed adjacent to the shaped lower portion or to engage the lower support boss 21a of the shaped end flange 21.

FIG. 4 also shows that a bearing surface 38 is formed on the outer face of the annular hub 31 between the indexing disk 37 and the annular shoulder 32 and rotatably mounted thereon is the band drum or gearless transfer element 39 of the actuating assembly 30.

ACTUATING ASSEMBLY

Actuating assembly 30 consists of associated and interengaging elements and coacts with the double acting locking assembly for achieving the desired functions and operations necessary to rotate the actuating shaft 25 serially through the required plurality of incremental angular or arcuate distances equivalent for example to the required number of holes to be drilled or cuts to be milled or ground in the blank defining the workpiece WP.

In order for the transfer element 39 to receive the necessary programming information as to the predetermined angular or arcuate distance to be transmitted to the indexing disk 37, the transfer element 39 is operatively connected to a measuring assembly generally designated 40 by a suitable connecting assembly generally designated 41, capable of converting the linear measurement set by the measuring assembly 40 to an angular or arcuate distance equivalent thereto.

Thus, referring to FIGS. 1, 2 and 3 to 6A, connecting assembly 41 is shown to include a flexible band element 42 connected at one end by any suitable means such as a rivet 43 to the outer face of the band drum or transfer element 39. The flexible band element 42 is disposed to extend and to wind about the outer surface of transfer element 39 transversely of the longitudinal line of the outer housing 11 for alignment and connection at the opposite end as by another rivet 44 with the outer end of setting rod 45 mounted for slidable movement in the longitudinal line of measuring assembly 40 which is also transverse to the longitudinal line of outer housing 11.

Flexible band 42 is preferably made of some suitable spring like metal material such as stainless steel, beryllium alloy, copper alloy or the like which is capable of winding about the band drum or transfer element 39 without distortion and able to withstand the many number of times that the transfer element 39 will be set and reset during use and operation of the gearless indexing device 10 in accordance with the present invention. Thus, the device in accordance with the present invention has associated rotating elements which will not materially wear, will have a long operating life with relative low maintenance, and will maintain accuracy of performance during the use and operation thereof.

Those skilled in the art will readily recognize that while a springlike metal band is illustrated in the preferred form of the present invention that other forms of flexible connectors such as mesh chains, woven or flexible plastic bands or plates or the like can be used in the place and stead of the illustrated flexible band 42 without departing from the scope of the present invention.

Measuring assembly 40 is mounted on a measuring assembly bracket 46 so that the longitudinal line of the measuring assembly 40 is maintained essentially transverse to the longitudinal line of the outer housing 11.

Measuring assembly 40 is a modified form of micrometer adapted for use in the gearless indexing device in accordance with the present invention. It includes a cylindrical spring housing 47 which is provided with a connecting boss 48 at one end for fixedly connecting the measuring assembly into a mounting opening 49 in the measuring assembly bracket 46. The cylindrical spring housing 47 is fixedly positioned in the mounting opening 49 in the measuring assembly mounting bracket 46 by means of a cross-pin 50 which traverses bore 51 in the connecting boss 48, all of which is clearly shown in FIGS. 5, 6 and 6a of the drawings.

FIGS. 5, 6 and 6A further show that the end of the setting rod 45 disposed for sliding movement in the bore 51 is slotted as at 52 along a portion of its length and is mounted to coact with the cross-pin 50 as shown in FIG. 6A so the setting rod 45 is prevented from twisting or turning during movement in and out of the measuring assembly 40 when the associated transfer element 39 is moved during the use and operation of the gearless indexing device 10.

The setting rod 45 is an elongated element provided with a transverse shoulder 45a in the medial section thereof. In assembled position in the spring chamber 53 of the spring housing 47, a coacting spring 54 is so mounted that it is disposed about the setting rod 45 with one end in abutment with the connecting boss end 48 of the spring housing 47 and the opposite end in abutment with the transverse shoulder 45a.

Figure 3:
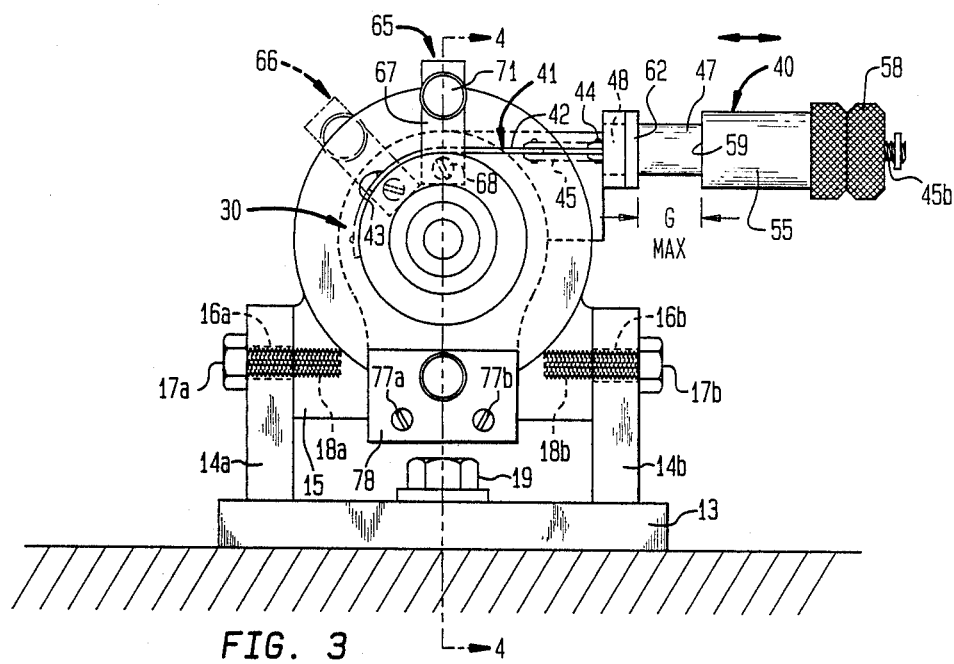
FIG. 3 is a back view of the gearless indexing device shown in FIG. 1 with a micrometer type measuring assembly thereon shown in side elevation, set at the maximum measuring span, and the upper locking member, is shown in solid lines set at a position corresponding to the initial zero position for the workpiece to be cut and is shown in phantomized dashed lines when rotated to the angular position corresponding to the measuring span shown on the measuring assembly.

On the opposite side of the transverse shoulder 45a setting rod 45 is threaded as at 45b and extends in the longitudinal line of the measuring assembly 40 where it is threadably connected to an adjustable cylindrical housing 55 slidably and adjustably mounted about the fixed cylindrical spring housing 47 for relative linear movement in the longitudinal line of measuring assembly 40. The adjustable cylindrical housing 55 has a threaded bore 56 in one end in which the threaded end 45b of the setting rod 45 is threadably connected and through which the said threaded end 45b extends for further threaded engagement with the threaded bore 57 in a locking nut 58 for locking the adjustable cylindrical housing 55 at a particular linear setting required to establish the distance that the elongated setting rod 45 can be moved during operation of the gearless transfer element 39, all of which is shown in FIGS. 3, 5 and 6 of the drawings.

When the locking nut 58 is loosened by unthreading the same the adjustable cylindrical housing 55 can be threaded along the threaded portion 45b of the setting rod 45 so that the inner end 59 of the cylindrical housing 55 can be positioned relative the spring housing 47. A scale 60 disposed on the measuring assembly bracket 46 adjacent to the said inner end 59 provides indicia 61 for setting the inner end 59 of the adjustable cylindrical housing 55 the proper distance for the drilling, milling, grinding or other cutting operation of the particular program to be applied to the workpiece WP. By rethreading the locking nut 58 the adjustable cylindrical housing 55 will be prevented from changing the setting.

Thus, when the cylindrical housing 55 is fixed by rethreading the locking nut 58 and the setting rod 45 is moved the cylindrical housing 55 will move therewith until the inner end 59 comes into abutment with a stop shoulder 62 formed on the outer face of boss 48 on the associated spring housing 47.

As shown in FIG. 5, the spring 54 normally will expand so as to force the setting rod 45 into the measuring assembly 40 until the point of connection or rivet 44 connecting the flexible band element 42 and the setting rod 45 abuts against the inner face of the connecting boss 48 at the point where the bore 51 extends through the connecting boss 48. This acts as a stop to prevent further expansion of the spring 54 and fixes the initial or zero setting position for the setting rod 45. After the adjustable cylindrical housing 55 is fixed to a given setting for example the maximum distance "G" as shown in FIG. 5, the setting rod 45 can be moved only the distance between this "G" setting and the point where the inner end 59 of the adjustable cylindrical housing 55 abuts the stop shoulder 62 formed on the spring housing 47. Since this represents the incremental distance that each of the holes, gears, flutes and the like must be serially cut in the workpiece WP, it is clear that some mechanism must be provided to enable the indexing disk 37 to be rotated this measured incremental distance again and again until the desired program for drilling, milling, grinding or cutting is completed. This is accomplished by the operative association of locking assembly 65 with the actuating assembly 30.

LOCKING ASSEMBLY

Thus, operatively connected to the band drum or gearless transfer element 39 is a first or upper locking member 66 which has an inverted L-shape, in cross-section. The first or upper locking member 66 is so positioned that the vertical leg 67 of the first locking member 66 can be connected as by threaded member 68 to the gearless transfer element 39 so that the horizontal leg 69 thereof is disposed a spaced distance from the outer face of the transfer element. In this position horizontal leg 69 will extend in the longitudinal line of the outer housing over the transfer element 39 and the indexing disk 37. In this assembled position, an indexing disk groove 70 in the horizontal leg 69 receives the projecting face of the outer circumferential portion of the indexing disk 37. When the first or upper locking member 66 is in assembled position a thumbscrew 71 threadably mounted in the threaded thumbscrew bore 72 in the horizontal leg 69 of the first locking member 66 can be manually threaded into movable engagement with a hardened metal pin 73 slidably mounted in a bore 74 in alignment with the threaded thumbscrew bore 72 for locking engagement with the adjacent side face of the associated circumferential portion of the indexing disk 37 disposed to rotate through the said indexing disk groove 70.

Whenever the first locking member 66 and the transfer element 39 are in the locked or engaged position the indexing disk 37 must rotate therewith. Conversely whenever the first locking member 66 is not in locking engagement with the indexing disk 37 the first locking member 66 and the associated gearless transfer element 39 are free to rotate relative the indexing disk 37 for reasons that will be clear when reference is made below to the operation of this embodiment of the invention.

Figure 2:
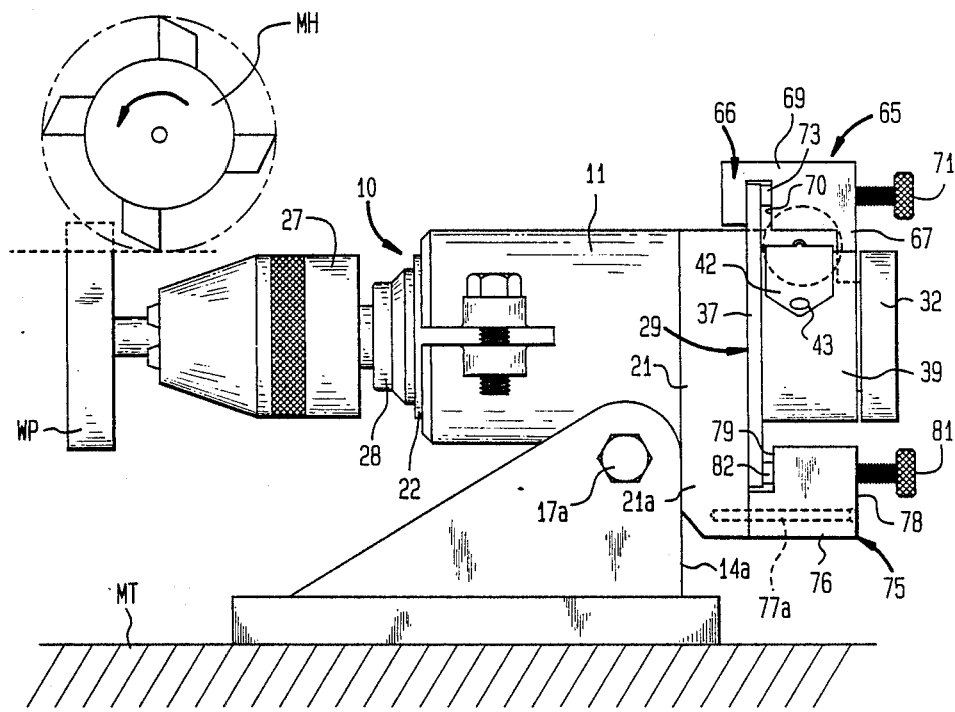
FIG. 2 is a left side elevational view of the gearless indexing device shown in FIG. 1.

A coacting second locking member 75 is provided which is also disposed for engagement with the outer face of the circumferential portion of the indexing disk 37. Second locking member 75 has a reverse L-shape in cross-section as shown in FIGS. 1, 2 and 4 of the drawings and is so positioned that the horizontal base section 76 provides means for connecting the second locking member 75 to the supporting boss 21a on the shaped flange 21 as by spaced threaded members 77a and 77b. In assembled position this will dispose the upper end of the vertical section 78 of the second locking member so that it defines a second indexing disk groove 79, with the outer face of the shaped portion 21a of the shaped flange 21, through which the outer circumferential portion of the indexing disk 37 can rotate. As in the first locking member 66 the second locking member 75 is provided with a threaded bore 80 in the said upper end of the vertical section 78 in which a second thumb screw 81 is threadably disposed to be threaded into and out of engagement with a second hardened metal pin 82 slidably mounted in a bore 83 in alignment with the threaded bore 80 for locking engagement with the adjacent side face of the associated outer circumferential portion of the indexing disk 37 disposed to rotate through the said indexing disk groove 79.

The second locking member 75 is used to lock the indexing disk 37 when it is necessary to unlock the first locking member 66 to permit the actuating assembly 30 to rotate freely back to the initial setting position. Conversely, the second locking member 75 is unlocked when the first locking member 66 is again locked to the indexing disk in the manner described so that on manual movement of the actuating assembly 30 the indexing disk 37 is again moved serially the predetermined incremental angular or arcuate distance equivalent to the linear measurement set by the actuating assembly 30.

OPERATION

In operation the workpiece WP is fixedly connected in the chuck 27 and the gearless indexing device 10 is then pivoted vertically and horizontally to position the workpiece for coaction with the machining head MH.

Next, the measuring assembly 40 is adjusted by releasing the locking nut 58, rotating the adjustable cylindrical housing 55 to the predetermined linear setting for a given program, and then locking the locking nut 58 to fix the position of the adjustable cylindrical housing 55 relative the spring housing 47.

One formula for establishing the linear setting of the adjustable cylindrical housing 55 is:

$$G = C/N$$

where:

G represents, the gap or linear distance between the end 59 of the adjustable cylindrical housing 55 and the shoulder 62 on the spring housing 47, C represents, the circumference of the band drum or gearless transfer element 39, and N represents, the number of divisions that must be drilled, milled, ground or otherwise cut.

For example, where the outer circumference of the band drum or transfer element is 3" and the number of divisions required is 16, then the gap or linear distance at which the adjustable cylindrical housing is set will be 0.1875".

Where the circumference of the band drum or transfer element is 5" and the number of divisions required is the same, then the gap or linear distance at which the adjustable housing is set will be 0.3125".

If the measuring assembly indicia is indicated in degrees then the formula for establishing the linear setting of the adjustable cylindrical housing 55 is:

$$G = C \times ° \div 360°$$

where:

G represents, the gap or linear distance between the end 59 of the adjustable cylindrical housing 55 and the stop shoulder 62, on the spring housing 47, C represents, the circumference of the band drum or transfer element 39, and ° represents the setting in degrees for the number of divisions that must be drilled, milled, ground or otherwise cut.

Thus, for a band drum or transfer element having a circumference of 3" and the desired drilled, milled, ground or other cuts will be at 45° to each other, then the gap or linear distance G will be 0.3750".

For a band drum or transfer element of 5" the gap or linear distance G will be 0.6250".

Once the adjustable cylindrical housing 55 has been set and fixed, the actuating assembly 30 can transfer this linear dimension to the indexing disk 37 by means of the first locking member 66 and the associated transfer element 39 on which it is mounted. This is accomplished by threading the first thumbscrew 71 and the first hardened pin 73 into locking engagement with the indexing disk 37 and then rotating the first locking member 66, transfer element 39, and the connecting assembly 41 until the inner end 59 of the adjustable cylindrical housing 55 is pulled into abutment with the stop shoulder 62 on the spring housing 47. During this rotation the transverse member 45a on the setting rod 45 will act to compress the spring 54.

If the first locking member 66 is now held in this position, the second thumbscrew 81 and the second hardened pin 82 can now be threaded into locking engagement with the indexing disk 37 to fix the position of the indexing disk 37 and the associated actuating shaft 25 to which it is fixedly connected.

The gearless indexing device 10 is then moved so that the workpiece WP is brought into engagement with the machining head MH to make the first cut for the predetermined program for the workpiece WP.

After the machining head has completed the first cut the first thumbscrew 71 on the first locking member 66 can then be released. The first locking member 66 and the band drum or transfer element 39 are now freely rotatable, and will by reason of the connecting assembly 41 and the forces generated by expansion of the spring 54 rotate back to the initial setting without disturbing or changing the position of the indexing disk 37, the actuating shaft 25, the chuck 27 and the workpiece WP connected thereto.

Now, the first locking member 66 is again locked to the outer circumference of the indexing disk 37 by means of the first thumbscrew 71, and the second locking member 75 is released from locking engagement by unthreading the second thumbscrew 81. The gearless indexing device 10 can then be repositioned again by rotating the indexing disk 37 the second same predetermined incremental distance for the program being drilled, milled, ground or cut on the workpiece WP.

The gearless indexing device 10 is now moved to make the second cut on the workpiece WP. In order to make the third and each consecutive and subsequent serial position for cutting the workpiece WP, the above steps are repeated until the predetermined program is completed.

Thus, a relatively simple gearless indexing device has been described which has been adapted for a variety of drilling, milling, grinding and other cutting operation on a component blank or workpiece requiring accurate positioning and repositioning and wherein the device is capable of maintaining its accuracy and durability for long periods of maintenance free use.

DETAILED DESCRIPTION OF ANOTHER PREFERRED EMBODIMENT OF THE INVENTION

Referring further to the drawings, FIGS. 7 to 14 show another embodiment of the gearless indexing device in accordance with the present invention generally designated 100. This form of the invention differs from the form of the invention shown in FIGS. 1 to 6A in that the operative association between the indexing disk and the coacting locking members for incremental rotation of the actuating shaft is eliminated and instead the coacting locking members are disposed for direct locking engagement with the band drum and the actuating shaft to provide the required incremental angular or arcuate rotation of the actuating shaft for establishing the desired drilling, cutting or machining program for the workpiece blank.

This form of the invention provides a simpler device which may be manufactured at a lower cost.

Gearless indexing device 100 includes a housing generally designated 101 having, a front end member 102, a back end member 103, and an annular casing 104 which is seated in a first peripheral groove 105 about the inner wall of the front end member 102 and a second peripheral groove 106 about the inner wall of the back end member 103 to hold the front end member and back end member in predetermined spaced relation to each other so as to define in the housing 101 a band drum chamber of space 107. The front end member 102, back end member 103, and annular casing 104 are held in assembled position by elongated tie-bolts 108a, 108b, 108c, and 108d, all of which is clearly shown in FIGS. 7, 8, 9, 10, and 12 of the drawings.

Annular casing member 104 has spaced trunnions as at 109a and 109b which extend in opposite directions from the lower section of the annular casing transversely of the longitudinal line of the gearless indexing device 100 when in assembled position on a base assembly 110 for supporting the housing 101. Trunnions 109a and 109b are provided with threaded bores 111a and 111b in the opposite ends thereof for mounting the housing 101 in the base assembly 110.

Base assembly 110 is provided with a flat platelike member 112 which has spaced uprightly extending generally triangular side supports 113a and 113b thereon so spaced that the ends of the spaced trunnions 109a and 109b can be disposed between the side supports to enable the threaded bores 111a and 111b to be aligned with bores or openings as at 114a and 114b in the respective upper apices of the triangularly shaped side support so that the threaded connecting bolts 115a and 115b can be extended therethrough for threaded engagement with the threaded bores 111a and 111b in the spaced trunnions 109a and 109b. Associated locking washers 116a and 116b for the respective threaded connecting bolts 115a and 115b make it simple to angularly position the now pivotally connected housing 101 of the gearless indexing device in the given vertical plane thereof, by merely loosening the connecting bolts 115a and 115b, positioning the housing to the desired angular vertical position, and then retightening the connecting bolts.

As in the first form of the invention shown in FIGS. 1 to 6A of the drawings and above described, a further connecting bolt 117 and associated locking washer 118 centered in the platelike member 112 of the base assembly 110 provides means for connecting the gearless indexing device 100 to a machining table, not shown in FIGS. 7 to 14, and further permits the gearless indexing device to be pivoted to any given horizontal angle in the horizontal plane of the platelike member.

Thus, in the use of the gearless indexing device 100 after the base assembly has been connected to the machining table the threaded connecting bolts 115a, 115b, and 117 can be alternatively and selectively loosened and tightened until the workpiece, also not shown in FIGS. 7 to 14, is in the desired vertical and horizontal position for drilling, cutting or machining the same in accordance with the required program in the same manner as has been above described for the form of the invention shown in FIGS. 1 to 6A of the drawings.

Referring further to the drawings FIGS. 7, 8, 9, 11 and 12 show that the back end member 103 of housing 101 is provided with a hub section 119 in which a centrally disposed bore 120 is formed to provide a bearing surface for rotatably mounting an elongated actuating shaft 121 of predetermined length so that it extends beyond the exterior of the front and back end members 102 and 103 of the housing 101. Elongated actuating shaft 121 as in the case of actuating shaft 25 for the first form of the invention above described serves to hold the workpiece, not shown, and to rotate the same through the desired incremental arcuate distances required for the performance of the program for drilling, cutting, or machining the workpiece. However, in this form of the invention as shown in FIGS. 7 to 14 of the drawings, the actuating shaft 121 also serves as a tie-bolt for holding the elements of the gearless indexing device in assembled position as will now be described.

Thus, elongated actuating shaft 121, which may be made out of any suitable type of material such as a steel alloy is shown as an elongated member dimensioned to extend along the longitudinal axis of the housing 101 to the exterior of the front end member 102 and the back end member 103. At the front end of the actuating shaft 121 a standard threaded connector 122 is provided on which any suitable type of chuck, face plate or other workpiece holder, not shown, for holding the workpiece, also not shown, can be mounted so that the workpiece can be held and rotated by the actating shaft 121 in the same manner above described for the actuating shaft 25 in the form of the invention shown in FIGS. 1 to 6A of the drawings. Inwardly of the standard threaded connector 122 a circumferential collar 123 is formed which defines a bearing surface or shoulder 124 against which the elements at the front end of the housing 101 will abut in assembled position. At the back or opposite end of the actuating shaft 121 a predetermined distance from the bearing surface or shoulder 124, a locking washer groove 125 is formed in which a removable or detachably connectible locking washer 126 is mounted to provide a back bearing surface or shoulder 127 for sequestering and engaging the elements at the back end of the housing 101 when they are in assembled position about the actuating shaft 121. Removable or detachably connectible locking washers 126 are available in the commercial marketplace under the Trademark "TRUEARC".

Now referring further to FIGS. 10, 11, 12 and 13, band drum 130, an annular member having a passage or elongated bore 131 extending end to end therethrough is shown as rotatably mounted about the medial section of the actuating shaft 121 which extends transversely through the band drum space or chamber 107 in the housing 101. Band drum 130 includes, a central section 132 and an elongated neck or annular flange 133 continuous therewith but of a lesser diameter to give the central section 132 a finite length such that it can be freely rotatable within the band drum chamber 107. The elongated neck or annular flange 133 projects forwardly from the central section 132 along and parallel to the longitudinal axis of the actuating shaft 121 through front opening 134 in the front end member 102 of housing 101 to a point adjacent the bearing surface 124 of the circumferential collar 123 on actuating shaft 121.

In this assembled position, the exterior of the elongated neck or annular flange 133 forms a bearing surface between the circumferential collar 123 and the exterior of the front end member 102 of the housing 101 sized for rotatably mounting thereon a front or first locking member 135. First locking member 135 is a generally U-shaped clamping member having an opening 136 which enables the front or first locking member 135 to be mounted about the elongated neck or annular flange 133 and to be positioned for operative coaction with the band drum 130, as is described in more detail hereinafter. The exterior surface of the elongated neck or annular flange 133 is provided with a plurality of keys or slots 137 to permit a set screw 138 on the front or first locking member 135 to be threaded into and out of engagement with a given key or slot 137 to set the front or first locking member 135 at any desired circumferential position during the assembly of the elements of the housing 101 of the gearless indexing device 100.

Figures 7, 8:
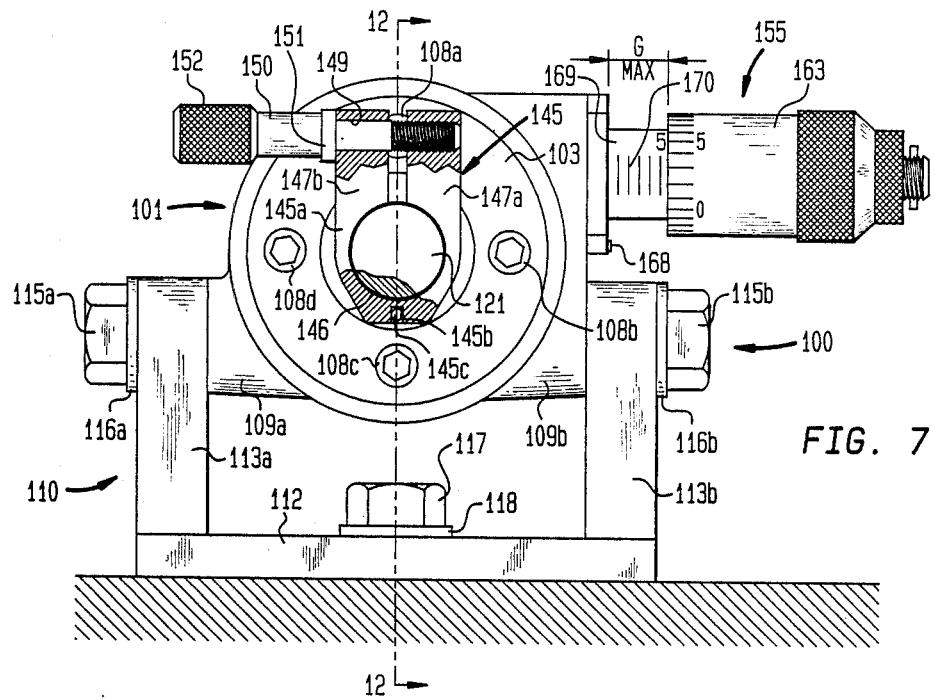
FIG. 7 is a back elevational end view of a second preferred embodiment of a gearless indexing device in accordance with the present invention and showing the measuring assembly positioned to provide a linear measurement where G is equal to the maximum setting.
FIG. 8 is a front elevational end view of the gearless indexing device shown in FIG. 7 and showing the measuring assembly positioned where G is equal to the zero position of the band drum.
Figure 9:
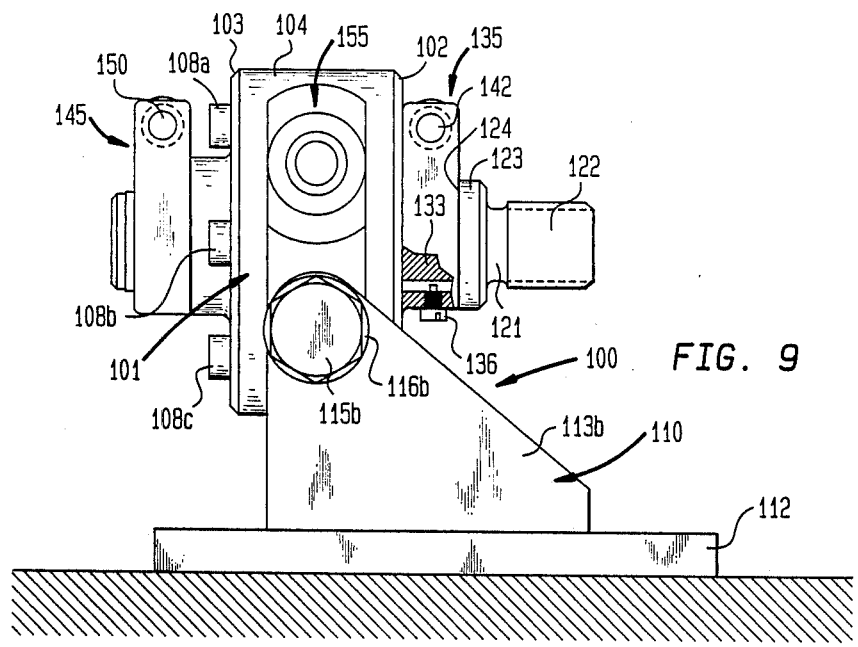
FIG. 9 is a right side view of the gearless indexing device shown in FIG. 7 with the front or first locking member broken away in fragmentary cross-section to show the operative relation with the slots in the elongated neck or annular flange on the band drum.
Figure 10:
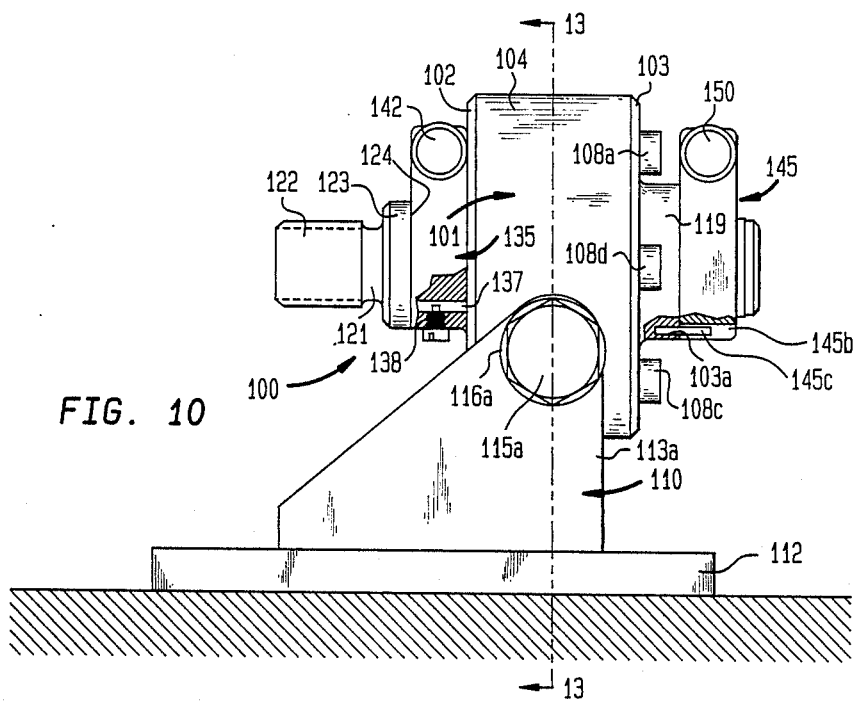
FIG. 10 is a left side view of the gearless indexing device shown in FIG. 7 with the back or second locking member broken away and in fragmentary cross-section to show how the second locking member is fixed to the housing so that it will not rotate during operation of the gearless indexing device.

U-shaped first locking member 135 has a center section 135a in which the opening 136 is provided for mounting the first locking member 135 in assembled position about the elongated neck or annular flange 133, and spaced coacting legs 139a and 139b projecting radially outward therefrom. When the legs 139a and 139b are squeezed together they cause the center section to clamp about the elongated neck 133 and the actuating shaft 121 so they can be rotated as a unit during operation of the gearless indexing device 100 as hereinafter described. In order to effect this clamping action leg 139a is provided with a threaded thumbscrew bore 140 and leg 139b is provided with an aligned opening 141 through which a thumbscrew 142 is inserted for engagement with the threaded thumbscrew bore 140. Thumbscrew 142 has an annular shoulder 143 disposed for abutment with the side of the spaced leg 139b and therefore when the thumbscrew 142 is manually tightened it will put the respective legs 139a and 139b towards each other to produce the required clamping action for clamping and locking the band drum 130 and the actuating shaft 121 to each other, as is required during the operation of the gearless indexing device 100. Thumbscrew 142 has a knurled handle 144 to facilitate manual rotation thereof, and all of the above is shown in FIGS. 8, 9, and 10 of the drawings.

Similarly outboard of the back end member 103, a back or second locking member 145 is mounted about the extended portion of the actuating shaft 121 between the exterior of the back end member 103 and the detachably connectible locking washer 126.

Second locking member 145 is also U-shaped with, a center section 145a in which an opening 146 is provided for mounting the second locking member 145 in assembled position about the extended section of the actuating shaft 121, and spaced coacting legs 147a and 147b project radially outward therefrom. The lower most section of the second locking member 145 is provided with an axial groove as at 145b which can be aligned with a setting pin bore 103a on the back end member 103 so that a setting pin 145b in assembled position in said groove 145b and setting bore pin 103a will act to prevent the second locking member 145 from rotating with the actuating shaft and prevent the actuating shaft from rotating during operation of the gearless indexing device 100 as is hereinafter described. Those skilled in the art will readily recognize that a plurality of setting pin bores can be provided to enable the second locking member 145 to be set at any desired circumferential position during assembly of the elements of the gearless indexing device 100.

As in the first locking member 135, when the legs 147a and 147b are squeezed together they cause the center section 145a to clamp about the actuating shaft 121 so that during operation of the gearless indexing device as hereinafter described, the actuating shaft 121 cannot be rotated until this clamping action is terminated by releasing the squeezing action on the legs 147a and 147b. In order to effect this clamping action leg 147a is provided with a threaded thumbscrew bore 148 and leg 147b is provided with an aligned opening 149 through which a thumbscrew 150 is inserted for engagement with the thumbscrew bore 148. Thumbscrew 150 has an annular shoulder 151 disposed for abutment with the side of spaced leg 147b. When the thumbscrew 150 is manually tightened by threading the same into the thumbscrew bore 148, it will put the respective coacting and spaced legs 147a and 147b towards each other to produce the required clamping action about the actuating shaft 121. Thumbscrew 150 has a knurled handle 152 to facilitate manual rotation thereof, all of which is shown in FIGS. 7, 9, and 10 of the drawings.

Thus, it will be clear that the actuating shaft 121 is so sized that it will hold in mounted and assembled position between the circumferential collar 123 and the detachably connectible locking washer 126, all of the elements of the housing 101; the band drum 131, and the coacting front or first locking member 135 and back or second locking member 145 to form a relatively simple compact unit which by reason of the trunnions 109a and 109b can be mounted and angularly positioned both horizontally and vertically on the base assembly 110 so that the machining table, not shown in FIGS. 7 to 14, can move the workpiece, also not shown, which is held and rotated by the actuating shaft 121 to the desired cutting position.

Gearless indexing device 100 operates for the same purposes and objects as was above described for the form of the invention shown in FIGS. 1 to 6A of the drawings. Therefore, it is necessary to provide means for rotating the actuating shaft 121 the required predetermined incremental arcuate distances step by step until the full set of arcuate or circumferential steps are completed for the drilling, cutting or machining programs which must be performed on the workpiece blank.

This is accomplished by so connecting the band drum or transfer element 121 to a suitable measuring assembly generally designated 155 that a linear measurement set by the measuring assembly 155 can first, be converted by the band drum or transfer element 121 into an arcute distance equivalent to this linear measurement, and then second, the band drum or transfer element 130 by suitable coaction with the first locking member 135 and second locking member 145 can so transfer this arcuate distance as to rotate the actuating shaft 121 this same arcuate amount incrementally step by step for the given circumferential program for drilling, cutting or machining the workpiece. Since the workpiece is fixedly connected to the actuating shaft the workpiece in turn will be rotated the same incremental arcuate distances step by step so that the desired drilling, cutting or machining program for the workpiece can be completed.

Figure 13:
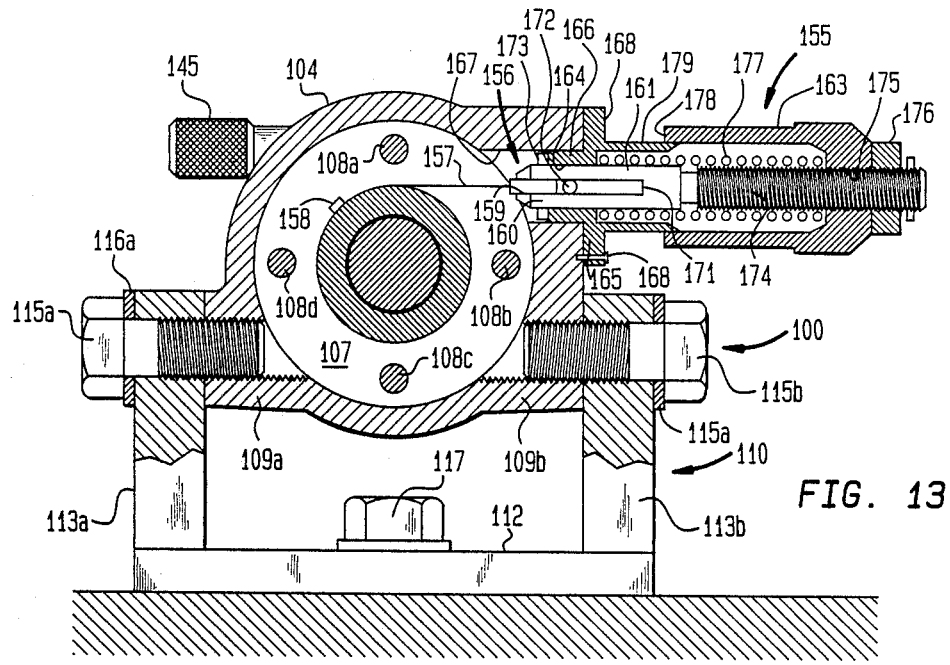
FIG. 13 is a vertical cross-section taken on line 13—13 of FIG. 10 showing the measuring assembly at a linear measurement where G is equal to a maximum setting and the band drum is at the zero position.
Figure 14:
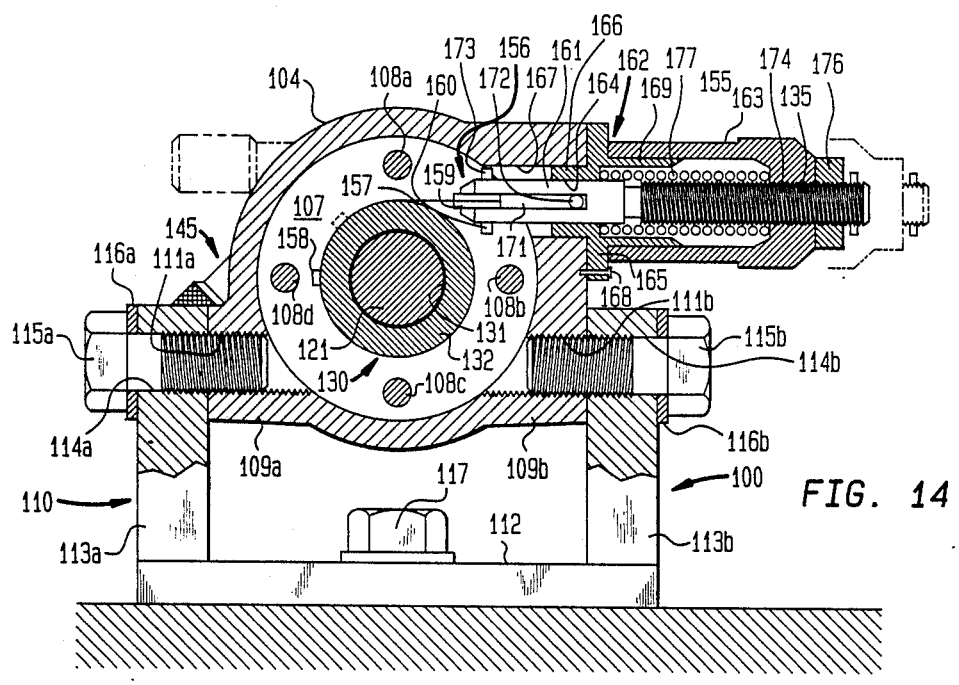
FIG. 14 is the same vertical cross-section shown in FIG. 13 with the band drum rotated from the zero position an arcuate distance equal to the linear measurement where G is equal to a maximum setting and the measuring assembly is moved to the zero position of the band drum in solid lines and the starting position of the band drum and the measuring assembly as shown in FIG. 13 shown phantomized in dotted lines.
Figure 15:
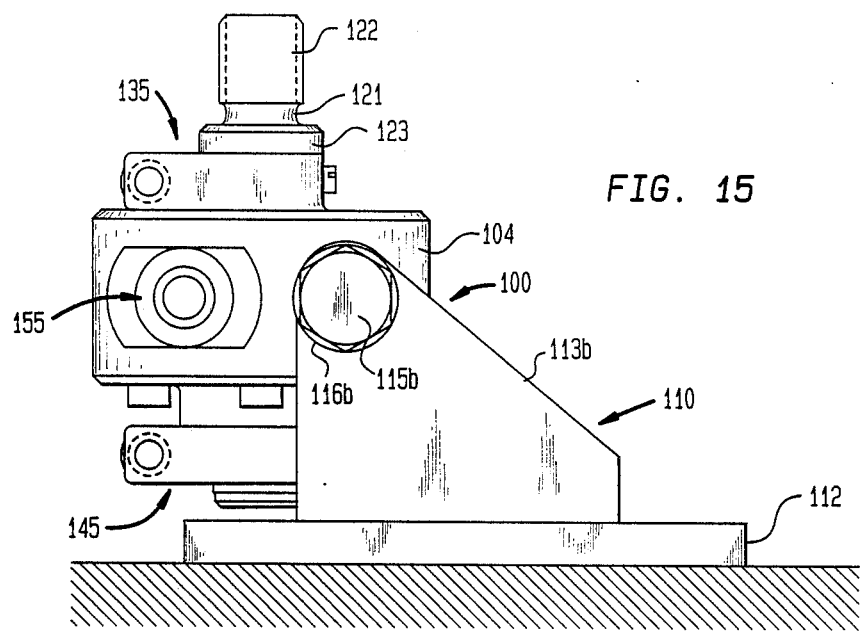
FIG. 15 is a side view of the gearless indexing device shown in FIGS. 7 to 15 of these drawings pivoted through an angle of 90° in the vertical plane of the gearless indexing device.

Accordingly, referring again to the drawings, FIGS. 13 and 14, show that a connecting assembly generally designated 156 between the band drum or transfer element 150 and the measuring assembly 155 enables the band drum 130 to convert the linear measurement set by the measuring assembly 155 to an arcuate distance equivalent to this linear measurement.

Connecting assembly 156 includes, a flexible band element 157 which is substantially identical to and is connected and operates in a manner substantially similar to the flexible band element 42 as above described for the form of the invention shown in FIGS. 1 to 6A of the drawings.

Thus flexible band element 157 is connected at one end by a rivet 158 to the exterior face of the band drum 130 so that the flexible band element 157 is disposed to wind and unwind about this exterior surface of the band drum 130, as the band drum 130 is rotated to and fro during operation of the gearless indexing device 100 as hereinafter described. The flexible band element 157 will extend from this point of attachment at 158 on the band drum 130 in a direction generally transverse to the longitudinal line of the housing 101 for alignment and connection at the opposite end by means of the connector 159 and transverse stop pin 160 to the adjacent end of an elongated setting rod 161 mounted for sliding movement in the aligned and coacting measuring assembly 155.

Measuring assembly 155, as in the form of the invention shown in FIGS. 1 to 6A is a modified micrometer adapted to meet the requirements of the gearless indexing device 100 and includes, a measuring assembly mounting bracket 162 and a cylindrical housing 163 which is adjustably connected to the mounting bracket 162 for movement relative thereto during operation of the gearless indexing device 100.

The measuring assembly mounting bracket 162 is a cylindrical member having a setting rod bore 164 extending end to end therethrough for slidably mounting the elongated setting rod 161 when the mounting bracket 162 is in assembled position on the housing 101. For this purpose the mounting bracket 162 has a medially disposed connecting flange 165 and on the inner side of flange 165, a cylindrical boss 166 which can be fitted into a transverse measuring assembly mounting bore 167 formed in the housing 101 so that the connecting flange 165 can be connected to the housing 101 by any suitable means such as threaded members 168. Cylindrical housing 163 is connected to the fixed mounting bracket 162 for the required adjustable and sliding movement to establish the linear measurement and to the connecting assembly 156 that on sliding movement of the connecting assembly 156 this linear movement will be converted into the incremental angular or arcuate distance equivalent to the linear measurement for rotating the actuating shaft 121, all of which is shown in FIGS. 7, 8, 11, 13 and 14 of the drawings.

Figure 11:
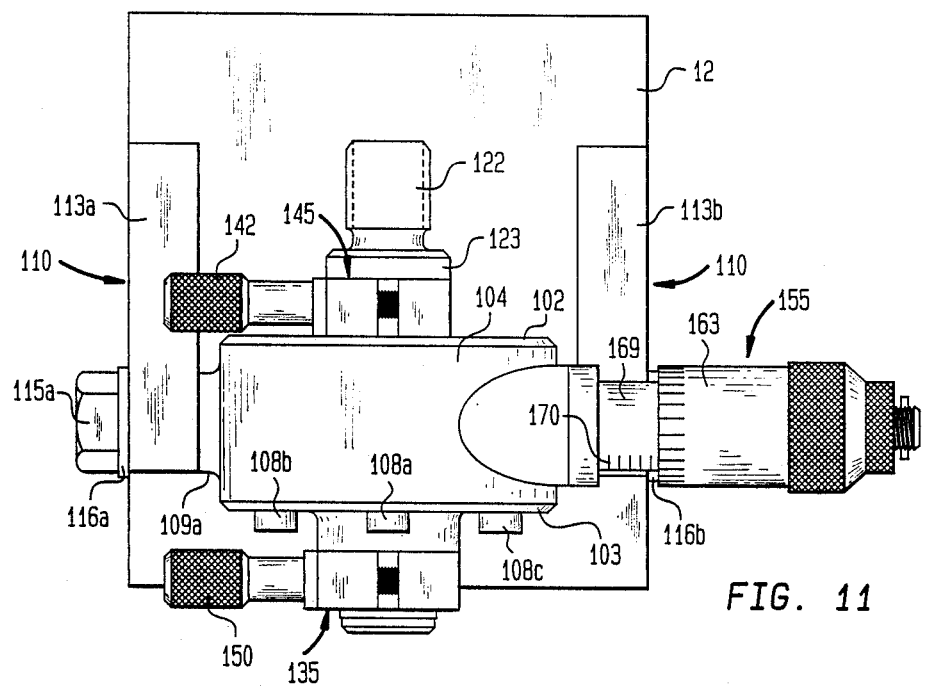
FIG. 11 is a top plan view of the gearless indexing device shown in FIG. 7.
Figure 12:
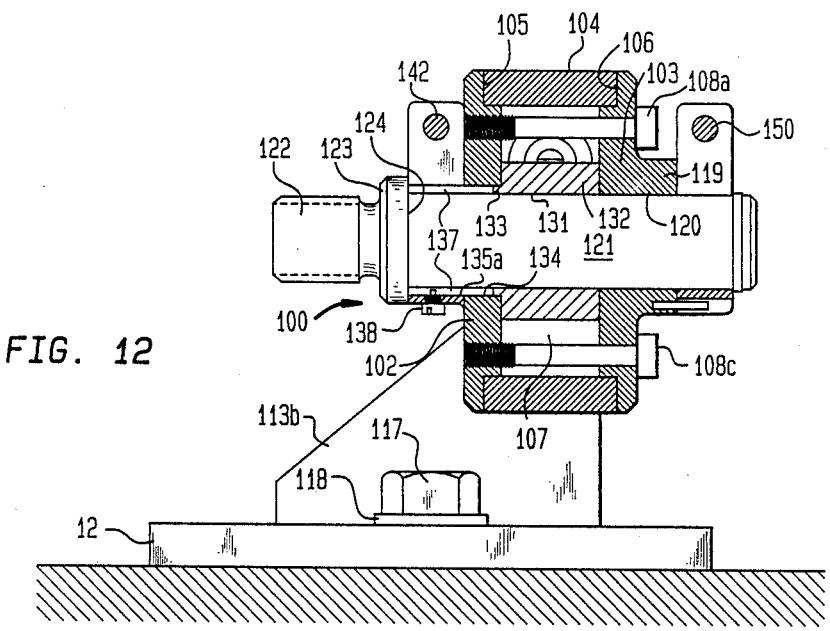
FIG. 12 is a vertical cross-section taken on line 12—12 of FIG. 7, with the actuating shaft in side elevation.

FIGS. 7 and 11 show that on the side of the connecting flange 165 opposite from the cylindrical boss 166 the mounting bracket 162 defines an elongated cylindrical spring housing 169 which has indicia lines and numbers on the outer surface thereof as at 170 so that the cylindrical housing 163 can be adjustably positioned to set the predetermined linear measurement.

Elongated setting rod 161 which is slidably mounted in the setting rod bore 164 for sliding movement to and fro in the longitudinal line of the measuring assembly 155 is slotted at one end as at 171 so that the connector 159 fits into the slot 171 and the transverse stop pin 160 can be extended therethrough to connect the respective ends of the flexible band element 157 and the setting rod 161 to each other. A transverse rod 172 in the setting rod bore 164 is also disposed in the medial section of the slot 171 when the setting rod is in assembled position and coacts with the setting rod 161 during movement thereof when the gearless indexing device 100 is being operated, to prevent the setting rod from rotating.

As is clearly shown in FIGS. 13 and 14, the transverse stop pin 160 has a length greater than the diameter of the setting rod 161. Therefore on movement of the setting rod in an outward direction, it will by engagement with the inner face 173 of the cylindrical boss 166 on the mounting bracket 162 act as a stop to prevent further movement of the setting rod 161 in this direction and will further provide the zero parameter for the linear measurement which is set by the measuring assembly 155.

The opposite end of the setting rod 161 is threaded as at 174 and is in threaded engagement with a threaded bore 175 in the closed end of the adjustable cylindrical housing 163. The setting rod 161 extends beyond the end of the cylindrical housing 163 and a threaded locking nut 176 fits on this threaded extension of the setting rod 161. The cylindrical housing 163 can be adjusted relative the cylindrical spring housing 169 by threading the cylindrical housing 163 to and fro along the setting rod 161. When the adjusted position is established the cylindrical housing can be locked in the adjusted position by means of the threaded locking nut 176.

Conventional resilient means such as a spring 177 is disposed about the setting rod 161 when it is in assembled position for sliding movement to and fro in the measuring assembly 155. Spring 177 abuts at one end with the inner wall of the spring housing 169 and at the opposite end with the inner wall of the cylindrical housing 163. Thus, the spring 177 will normally urge the setting rod 161 and the cylindrical housing 163 in an outward direction until the stop pin 160 comes into engagement with the inner face 173 of the cylindrical boss 166.

Since the stop pin 160 provides one parameter for the linear measurement set by the measuring assembly 155, it is only necessary to establish the second or opposite parameter for the length of the linear measurement. This is obtained by threading the cylindrical housing 163 in one direction or the other along the setting rod 161 until the perimeter or annular rim 178 of the cylindrical housing 163 is properly positioned relative the indicia lines and numbers 170 on the outer surface of the cylindrical spring housing 169. When this opposite or second parameter is established for the required length of the linear measurement, cylindrical housing 163 is locked in this adjusted position by means of the threaded locking nut 176.

Outward movement of the setting rod 161 and the cylindrical housing 163 connected thereto is limited by the stop pin 160. Similarly the inward movement of the setting rod 161 and the cylindrical housing 163 is also limited because the perimeter or annular rim 178 on inward movement is limited and stopped when it comes into abutment with the outer face 179 of the connecting flange 165 on mounting bracket 162, all of which is clearly shown by FIGS. 11, 13 and 14 of the drawings.

Thus, when band drum 130 is rotated as hereinafter described, the flexible band element 157 and the operatively connected setting rod 161 of the connecting assembly 156 will move therewith transversely of the longitudinal line of the housing 101. As the setting rod 161 and the cylindrical housing 163 are moved they will act to compress spring 177. This inward movement of the setting rod 161 and cylindrical housing 163 and the rotation of the band drum 130 can continue only until the perimeter or annular rim 178 of the cylindrical housing 163 comes into abutment with the outer face 179 of the connecting flange 165 on the mounting bracket 162. However, because the flexible band element 157 winds about the outer surface of the band drum 130 during the rotation thereof, the arcuate distance established during this rotation is equivalent to the linear measurement set by the measuring assembly 155.

By alternatively and selectively bringing the front or first locking member 135 into clamping engagement with the band drum 131, and the back or second locking member 145 into clamping engagement with the actuating shaft 121, the actuating shaft 121 can be moved this same arcuate distance as the band drum 130 and this can be done in a step by step procedure until the full circumferential pattern for a given drilling, cutting, or machining operation for the workpiece is completed as will now be described.

OPERATION OF THE SECOND EMBODIMENT OF THE INVENTION

In operation, the chuck or other workpiece holder, not shown, is affixed to the standard threaded connector 122 on the actuating shaft 121 of the gearless indexing device 100 in accordance with this embodiment of the invention. The workpiece blank, also not shown, is then affixed in the chuck or workpiece holder so that it will rotate whenever the actuating shaft 121 is rotated.

As in the form of the invention shown in FIGS. 1 to 6A of the drawings and above described, the gearless indexing device is positioned on the machining table and adjusted to the desired position for engagement with the drilling, cutting or other machining tool to be used for the given pattern to be machined on the workpiece blank.

The actuating shaft 121 under action of the spring 177 will automatically be rotated to a first or zero position and can be fixed in this position by tightening thumbscrew 150 so that the second locking member 145 will clamp the actuating shaft 121 and holds it in this zero position. Measuring assembly 155 is now adjusted as above described to set the required linear measurement for the given drilling, cutting or machining pattern to be performed on the workpiece blank.

Since the actuating shaft is set at the zero position the machining table is moved to perform the first machining operation on the workpiece blank.

When the first machining operation is completed thumbscrew 142 is now tightened to bring the front or first locking member 135 into clamping engagement with the elongated or annular neck 133 of the band drum 131 and the associated actuating shaft 131. The thumbscrew 150 can now be loosened to release the back or second locking member 145 from clamping engagement with the actuating shaft 121. By now rotating the first locking member 135, the band drum 130 and the actuating shaft 121 can be rotated the required arcuate distance, in the manner above described, until the perimeter or annular rim 178 of the cylindrical housing 163 comes into engagement with the outer face 179 of the connecting flange 165.

While the first locking member 135 is held in this first rotated position, the thumbscrew 150 of the second locking member 145 is tightened to clamp the actuating shaft 121 in this first rotated position and the second machining step can now be performed on the workpiece blank at this first arcuate distance from the zero position of the first machining operation.

By loosening the thumbscrew 142 of the first locking member 135 the band drum 130 can rotate freely back to the zero setting as the compress spring 177 expands so that it will be ready for the next step by which the actuating shaft 121 is again rotated the required arcuate distance equivalent to the linear measurement set by the measuring assembly 155.

When the second machining operation is completed, thumbscrew 142 of the first locking member 135 is again tightened to clamp the elongated neck of the band drum 130 and the actuating shaft 121 together. When thumbscrew 150 of the second locking member 145 is now loosened the band drum 130 and actuating shaft 121 can again be rotated the required incremental arcuate distance and held until the second locking member 145 is again locked to permit the third machining operation at this second arcuate position of the workpiece to be completed.

The first locking member 135 is now released from clamping engagement once again to permit the band drum 130 to rotate back to the zero position under action of the spring 177 as above described, and the process of rotating the actuating shaft 121 is repeated in the same manner for the third and each successive arcuate step until the actuating shaft 121 is rotated through the entire circumferential program for the given drilling, cutting or machining step for the workpiece blank back to the original zero position.

The method for calibrating the predetermined incremental arcuate distance for a given drilling, cutting or machining program for workpiece blank is the same for this form of the invention as has been above described for the form of the invention shown in FIGS. 1 to 6A of the drawings. Accordingly, this method will not be further described for this second embodiment of the invention.

While the foregoing description illustrates various preferred embodiments of apparatus and systems in accordance with the present invention, it will be appreciated that certain changes and modifications may be made in the structure of these disclosed arrangements without departing from the spirit and scope of the invention and that the same is defined by the claims as hereinafter set forth.

What is claimed is:

1. A gearless indexing device for positioning and repositioning a workpiece comprising,
   a. housing means,
   b. shaft means rotatable mounted in said housing means for positioning and repositioning the workpiece on rotation of the shaft means,
   c. holder means for the workpiece fixedly connected to said shaft means and rotatable with said shaft means,
   d. actuating means including, means for setting a predetermined measured distance for positioning and repositioning the workpiece,
   e. said actuating means selectively and operatively connectable to the shaft means for serially rotating the shaft means an arcuate distance equivalent to the said set predetermined measured distance,
   f. gearless transfer means on said actuating means operatively connectable between the means for setting the predetermined incremental distance and said shaft means for converting the predetermined measured distance into an equivalent arcuate distance and for transmitting the same to said shaft means, and
   g. locking means for operative coaction with the gearless transfer means and detachably connectable selectively and operatively to the shaft means for serially rotating the shaft means the arcuate distance equivalent to the set predetermined measured distance, wherein said locking means includes,
      i. a first locking member detachable connectable selectively and operatively to said gearless transfer means and said shaft means adapted in the locked position to rotate said gearless transfer means and said shaft means from an initial position an arcuate distance equivalent to the predetermined measured distance,
      ii. a second locking member detachably connectable to said shaft means and in the locked position thereof to hold the same at the said arcuate distance, and
      iii. said first locking member in the unlocked position to permit the gearless transfer means to rotate freely back to the initial position to permit further rotation of the shaft means.

2. A gearless indexing device for positioning and repositioning a workpiece comprising,
   a. housing means,
   b. shaft means rotatably mounted in said housing means for positioning and repositioning the workpiece on rotation of the shaft means,
   c. holder means for the workpiece fixedly connected to said shaft means and rotatable with said shaft means,
   d. actuating means including, means for setting a predetermined measured distance for positioning and repositioning the workpiece,
   e. said actuating means selectively and operatively connectable to the shaft means for serially rotating the shaft means an arcuate distance equivalent to the said set predetermined measured distance,
   f. gearless transfer means on said actuating means operatively connectable between the means for setting the predetermined incremental distance and said shaft means for converting the predetermined measured distance into an equivalent arcuate distance and for transmitting the same to said shaft means,
   g. locking means for operative coaction with the gearless transfer means and detachably connectable selectively and operatively to the shaft means for serially rotating the shaft means the arcuate distance equivalent to the set predetermined measured distance, wherein,
      i. said locking means includes, a first locking member detachably connectable selectively and operatively to said gearless transfer means and said shaft means adapted in the locked position to rotate said gearless transfer means and said shaft means from an initial position an arcuate distance equivalent to the predetermined measured distance, and a second locking member detachably connectable to said shaft means and in the locked position thereof to hold the same at the said arcuate distance, ii. said first locking member in the unlocked position to permit the gearless transfer means to rotate freely back to the initial position to permit further rotation of the shaft means at the locked position of said first locking member, and h. resilient means operatively connected to said gearless transfer means for automatically returning the gearless transfer means to the initial position when the first locking member is in the unlocked position.

3. A gearless indexing device for positioning and repositioning a workpiece comprising,
   a. housing means,
   b. shaft means rotatably mounted in said housing means for positioning and repositioning the workpiece on rotation of said shaft means,
   c. holder means for said workpiece fixedly connected to and rotatable with said shaft means,
   d. indexing means fixedly connected to said shaft means for rotating said shaft means,
   e. gearless actuating means including, means for setting a predetermined measured distance for positioning and repositioning the workpiece,
   f. said gearless actuating means detachably connectable selectively and operatively to the indexing means for serially rotating the indexing means an arcuate distance equivalent to the said set predetermined measured distance,
   g. gearless transfer means on said gearless actuating means operatively connectable between the means for setting the predetermined incremental distance and said indexing means for converting the predetermined measured distance into an equivalent arcuate distance and for transmitting the same to said indexing means, and
   h. locking means for operative coaction with the gearless transfer means and detachably connectable selectively and operatively to the indexing means for serially rotating the shaft means the arcuate distance equivalent to the said set predetermined measured distance wherein said locking means includes,
      i. a first locking member connected to said gearless transfer means and detachably connectable selectively and operatively to said indexing means,
      ii. said second locking member detachably connectable selectively and operatively to said indexing means, and
      iii. said first locking member and second locking member selectively and alternatively connectable to permit serial movement of the shaft means the arcuate distance equivalent to the predetermined measured distance.

4. A gearless indexing device for positioning and repositioning a workpiece comprising,
   a. housing means,
   b. shaft means rotatably mounted in said housing means for positioning and repositioning the workpiece on rotation of said shaft means,
   c. holder means for said workpiece fixedly connected to and rotatable with said shaft means,
   d. indexing means fixedly connected to said shaft means for rotating said shaft means,
   e. gearless actuating means including, means for setting a predetermined measured distance for positioning and repositioning the workpiece,
   f. said gearless actuating means detachably connectable selectively and operatively to the indexing means for serially rotating the indexing means an arcuate distance equivalent to the said set predetermined measured distance,
   g. gearless transfer means on said gearless actuating means operatively connectable between the means for setting the predetermined incremental distance and said indexing means for converting the predetermined measured distance into an equivalent arcuate distance and for transmitting the same to said indexing means, and
   h. locking means for operative coaction with the gearless transfer means and detachably connectable selectively and operatively to the indexing means for serially rotating the shaft means the arcuate distance equivalent to the said set predetermined measured distance wherein said locking means includes,
      i. a first locking member detachably connectable selectively and operatively to said gearless transfer means and said indexing means and adapted in the locked position to rotate said gearless transfer means and said shaft means from an initial position an arcuate distance equivalent to the predetermined measured distance,
      ii. a second locking member detachably connectable selectively and operatively to said indexing means and in the locked position to hold the shaft at the said arcuate distance, and
      iii. said first locking member in the unlocked position to permit the gearless transfer means to rotate freely back to the initial position to permit further rotation of the shaft means at the locked position of said first locking member.

5. In a gearless indexing device as claimed in claim 4 including,
   resilient means operatively connected to said gearless transfer means for automatically returning the gearless transfer means to the initial position when the first locking member is in the unlocked position.

6. A gearless indexing device for positioning and repositioning a workpiece comprising,
   a. housing means,
   b. shaft means rotatably mounted in said housing means for positioning and repositioning the workpiece on rotation of said shaft means,
   c. holder means for said workpiece fixedly connected to and rotatable with said shaft means,
   d. indexing means fixedly connected about said shaft means for rotating said shaft means,
   e. gearless actuating means rotatably mounted about said indexing means and including, means for setting a predetermined measured distance for positioning and repositioning the workpiece,
   f. said gearless actuating means detachably connectable selectively and operatively to the indexing means for serially rotating the indexing means an arcuate distance equivalent to the said set predetermined measured distance, and
   g. resilient means operatively connected to said gearless transfer means to normally maintain the gearless actuating means at an initial setting.

7. A gearless indexing device for positioning and repositioning a workpiece comprising,
   a. housing means, b. shaft means rotatably mounted in said housing means for positioning and repositioning the workpiece on rotation of said shaft means,
c. holder means for said workpiece fixedly connected to and rotatable with said shaft means,
d. indexing means fixedly connected to said shaft means for rotating said shaft means,
e. annular radially extending flange means formed on said indexing means,
f. gearless actuating means including,
  i. means for setting a predetermined measured distance for positioning and repositioning the workpiece,
  ii. measuring means for setting said predetermined measured distance, and
  iii. gearless transfer means for transmitting said set predetermined measured distance,
g. said gearless actuating means detachably connectable selectively and operatively to the indexing means for serially rotating the indexing means an arcuate distance equivalent to the said set predetermined measured distance,
h. locking means operatively connectable to said gearless transfer means and detachably connectable to said annular flange for serially rotating the indexing means an arcuate distance equivalent to the predetermined measured distance set by said measuring means, and
i. resilient means operatively connected to said gearless transfer means to normally maintain the gearless transfer means at the initial setting.

8. A gearless indexing device for positioning and repositioning a workpiece comprising,
a. housing means,
b. shaft means rotatably mounted in said housing means for positioning and repositioning said workpiece,
c. holder means for the workpiece fixedly connected to the shaft means and rotatable therewith,
d. actuating means including, means for setting a predetermined measured distance, and gearless transfer means for transmitting the predetermined measured distance, and
e. locking means detachably connectable to both said gearless transfer means and shaft means for serially rotating the shaft means step by step from an initial setting arcuate distances each equivalent to said predetermined measured distance wherein said locking means includes,
  i. a first locking member disposed for operative coaction with the gearless transfer means and said shaft means in the locked position to simultaneously move the gearless transfer means and shaft means from an initial position an arcuate distance equivalent to the predetermined measured distance,
  ii. a second locking member for operative coaction with the shaft means in the locked position to hold the shaft means in each given serial position established by the first locking member and in the unlocked position to permit the first locking member to serially position the shaft means, and
  iii. said gearless transfer means free to rotate back to said initial position when the first locking member is in the unlocked position.

9. In a gearless indexing device as claimed in claim 8 including, resilient means connected to the gearless transfer means for normally maintaining the gearless transfer means in the initial position.

10. A gearless indexing device for positioning and repositioning a workpiece comprising,
a. housing means,
b. shaft means rotatably mounted in said housing means for positioning and repositioning said workpiece,
c. holder means for the workpiece fixedly connected to the shaft means and rotatable therewith,
d. actuating means including, means for setting a predetermined measured distance, and gearless transfer means for transmitting the predetermined measured distance, wherein said gearless transfer means includes, an annular means rotatably mounted about the shaft means, and an annular collar disposed to extend along the shaft means, and
e. locking means detachably connectable to both said gearless transfer means and said shaft means for serially rotating the shaft means step by step from an initial setting arcuate distances each equivalent to said predetermined measured distance, said locking means in assembled position disposed about the annular collar whereby on movement to the locked position the locking means will clamp both the annular collar and the shaft means.

11. In a gearless indexing device as claimed in claim 8 wherein,
a. said gearless transfer means includes, an annular means rotatably mounted about the shaft means, and an annular collar disposed to extend along the shaft means,
b. said first locking member having a U-shape and disposed about the annular collar,
c. clamping means on said first locking member adapted to clamp the first locking member about the annular collar and the shaft means.

12. A gearless indexing device for positioning and repositioning a workpiece comprising,
a. housing means,
b. shaft means rotatably mounted in said housing means for positioning and repositioning said workpiece,
c. holder means for the workpiece fixedly connected to the shaft means and rotatable therewith,
d. actuating means including, means for setting a predetermined measured distance, and gearless transfer means for transmitting the predetermined measured distance, wherein said gearless transfer means includes, an annular means rotatably mounted about the shaft means, and an annular collar disposed to extend along the shaft means, and
e. locking means detachably connectable to both said gearless transfer means and said shaft means for serially rotating the shaft means step by step from an initial setting arcuate distances each equivalent to said predetermined measured distance, wherein
  i. said locking means includes, a first locking member, and a second locking member,
  ii. said first locking member having a U-shape and disposed in assembled position about the annular collar, and clamping means for releasably locking the first locking member to the annular collar and the shaft means, and
  iii. said second locking member having, a U-shaped portion disposed in assembled position about the shaft means, and clamping means for releasably locking the second locking member alternatively and selectively to permit the first locking member to serially rotate the shaft means.

13. In a gearless indexing device as claimed in claim 12 including, resilient means connected to the gearless transfer means for normally maintaining the gearless transfer means in the initial position.

14. A gearless indexing device for positioning and repositioning a workpiece comprising,
   a. housing means,
   b. shaft means rotatably mounted in said housing means for positioning and repositioning the workpiece on rotation of the shaft means,
   c. holder means for the workpiece fixedly connected to said shaft means and rotatable with said shaft means,
   d. actuating means including, means for setting a predetermined measured distance for positioning and repositioning the workpiece,
   e. said actuating means selectively and operatively connectable to the shaft means for serially rotating the shaft means an arcuate distance equivalent to the said set predetermined measured distance,
   f. gearless transfer means on said actuating means operatively connectable between the means for setting the predetermined incremental distance and said shaft means for converting the predetermined measured distance into an equivalent arcuate distance and for transmitting the same to said shaft,
   g. said gearless transfer mean includes, annular means for rotatably mounting the gearless transfer means in assembled position, and
   h. generally flexible band means connected at one end to the annular means and at the end remote therefrom to the measuring means.

15. A gearless indexing device for positioning and repositioning a workpiece comprising,
   a. housing means,
   b. shaft means rotatably mounted in said housing means for positioning and repositioning the workpiece on rotation of said shaft means,
   c. holder means for said workpiece fixedly connected to and rotatable with said shaft means,
   d. indexing means fixedly connected to said shaft means for rotating said shaft means,
   e. gearless actuating means including, means for setting a predetermined measured distance for positioning and repositioning the workpiece,
   f. said gearless actuating means detachably connectable selectively and operatively to the indexing means for serially rotating the indexing means an arcuate distance equivalent to the said set predetermined measured distance,
   g. gearless transfer means on said gearless actuating means operatively connectable between the means for setting the predetermined incremental distance and said indexing means for converting the predetermined measured distance into an equivalent arcuate distance and for transmitting the same to said indexing means,
   h. said gearless transfer means includes, annular means for rotatably mounting the gearless transfer means in assembled position, and
   i. generally flexible band means connected at one end to the annular means and at the end remote therefrom to the measuring means.

16. A gearless indexing device for positioning and repositioning a workpiece comprising,
   a. housing means,
   b. shaft means rotatably mounted in said housing means for positioning and repositioning the workpiece on rotation of the shaft means,
   c. holder means for the workpiece fixedly connected to said shaft means and rotatable with said shaft means,
   d. actuating means including, means for setting a predetermined measured distance for positioning and repositioning the workpiece,
   e. said actuating means selectively and operatively connectable to the shaft means for serially rotating the shaft means an arcuate distance equivalent to the said set predetermined measured distance,
   f. gearless transfer means on said actuating means operatively connectable between the means for setting the predetermined incremental distance and said shaft means for converting the predetermined measured distance into an equivalent arcuate distance and for transmitting the same to said shaft,
   g. said gearleas transfer means includes, annular means for rotatably mounting the gearless transfer means in assembled position,
   h. said measuring means including, setting rod means, and
   i. connecting means for connecting the gearless transfer means to the measuring means including, flexible band means connected at one end to the annular means and at the end remote therefrom to the setting rod.

17. A gearless indexing device for positioning and repositioning a workpiece comprising,
   a. housing means,
   b. shaft means rotatably mounted in said housing means for positioning and repositioning the workpiece on rotation of said shaft means,
   c. holder means for said workpiece fixedly connected to and rotatable with said shaft means,
   d. indexing means fixedly connected to said shaft means for rotating said shaft means,
   e. gearless actuating means including, means for setting a predetermined measured distance for positioning and repositioning the workpiece,
   f. said gearless actuating means detachably connectable selectively and operatively to the indexing means for serially rotating the indexing means an arcuate distance equivalent to the said set predetermined measured distance,
   g. gearless transfer means on said gearless actuating means operatively connectable between the means for setting the predetermined incremental distance and said indexing means for converting the predetermined measured distance into an equivalent arcuate distance and for transmitting the same to said indexing means,
   h. said gearless transfer means includes, annular means for rotatably mounting the gearless transfer means in assembled position,
   i. said measuring means including, setting rod means, and
   j. connecting means for connecting the gearless transfer means to the measuring means including, flexible band means connected at one end to the annular means and at the end remote therefrom to the setting rod.

18. In the gearless indexing device as claimed in claim 16 wherein the setting rod includes, means to prevent the setting rod from rotating during operation of the gearless indexing device.

19. A gearless indexing device for positioning and repositioning a workpiece comprising,
   a. housing means,
   b. shaft means rotatably mounted in said housing means for positioning and repositioning the workpiece on rotation of said shaft means,
   c. holder means for said workpiece fixedly connected to and rotatable with said shaft means,
   d. indexing means fixedly connected to said shaft means for rotating said shaft means, wherein said indexing means includes an annular hub means connected about the shaft, and annular flange means projecting radially outward from the annular hub means,
   e. gearless actuating means rotatably mounted about the annular hub means said gearless actuating means including, means for setting a predetermined measured distance for positioning and repositioning the workpiece,
   f. said gearless actuating means detachably connectable selectively and operatively to the indexing means for serially rotating the indexing means an arcuate distance equivalent to the said set predetermined measured distance,
   g. locking means operatively connected to the gearless actuating means and detachably and selectively connectable to said annular flange means to move the indexing means serially an arcuate distance equivalent to the said set predetermined measured distance, and
   h. resilient means operatively connected to said gearless transfer means to normally maintain the gearless actuating means at an initial setting.

20. A gearless indexing device for positioning and repositioning a workpiece comprising,
   a. housing means,
   b. shaft means rotatably mounted in said housing means for positioning and repositioning said workpiece,
   c. holder means for the workpiece fixedly connected to the shaft means and rotatable therewith,
   d. actuating means including, means for setting a predetermined measured distance, and gearless transfer means for transmitting the predetermined measured distance, wherein said gearless transfer means includes,
      i. annular means for rotatably mounting the gearless transfer means in assembled position, and
      ii. generally flexible band means connected at one end to the annular means and at the end remote therefrom to the measuring means, and
   e. locking means detachably connectable to both said gearless transfer means and said shaft means for serially rotating the shaft means step by step from an initial setting arcuate distances each equivalent to said predetermined measured distance.

21. A gearless indexing device for positioning and repositioning a workpiece comprising,
   a. housing means,
   b. shaft means rotatably mounted in said housing means for positioning and repositioning said workpiece,
   c. holder means for the workpiece fixedly connected to the shaft means and rotatable therewith,
   d. actuating means including,
      i. measuring means for setting a predetermined measured distance, said measuring means including, setting rod means,
      ii. gearless transfer means for transmitting the predetermined measured distance, said gearless transfer means including, annular means for rotatably mounting the gearless transfer means in assembled position, and
      iii. connecting means for connecting the gearless transfer means to the measuring means including, flexible band means connected at one end to the annular means and at the end remote therefrom to the setting rod, and
   e. locking means detachably connectable to both said gearless transfer means and said shaft means for serially rotating the shaft means step by step from an initial setting arcuate distances each equivalent to said predetermined measured distance.

22. A gearless indexing device for positioning and repositioning a workpiece comprising,
   a. housing means,
   b. shaft means rotatably mounted in said housing means for positioning and repositioning the work piece on rotation of the shaft means,
   c. holder means for the workpiece fixedly connected to said shaft means and rotatable with said shaft means,
   d. actuating means including, means for setting a predetermined measured distance for positioning and repositioning the workpiece,
   e. said actuating means selectively and operatively connectable to the shaft means for serially rotating the shaft means an arcuate distance equivalent to the said set predetermined measured distance,
   f. gearless transfer means on said actuating means operatively connectable between the means for setting the predetermined incremental distance and said shaft means for converting the predetermined measured distance into an equivalent arcuate distance and for transmitting the same to said shaft means, and
   g. locking means for operative coaction with the gearless transfer means and detachably connectable selectively and operatively to the shaft means for serially rotating the shaft means the arcuate distance equivalent to the set predetermined measured distance, wherein said locking means includes,
      i. a first locking member connected to said gearless transfer means and detachably connectable selectively and operatively to said shaft means,
      ii. a second locking member detachably connectable selectively and operatively to said shaft means, and
      iii. said first locking member and second locking member alternatively connectable so as to permit serial movement of the shaft means arcuate distances each equivalent to the predetermined measured distance.

* * * * *

UNITED STATES PATENT AND TRADEMARK OFFICE
CERTIFICATE OF CORRECTION

PATENT NO. : 4,819,923

DATED : April 11, 1989

INVENTOR(S) : Peter C. Zumbusch

It is certified that error appears in the above-identified patent and that said Letters Patent is hereby corrected as shown below:

```
Column 5, line 30, "rutating" should read --rotating--.
Column 5, line 49, "I ia" should read --11a--.
Column 6, line 68, "21aof" should read --21a of--.
Column 13, line 37, "actating" should read --actuating--.
Column 14, line 64, "145b" should read --145c--.
Column 15, line 32, "131" should read --130--.
Column 16, line 4, "150" should read --130--.

Column 19, line 56, "rotatable" should read --rotatably--.

Column 20, line 56, "operatiyely" should read --operatively--.
Column 26, line 23, "gearleas" should read --gearless--.
```

Signed and Sealed this

Twenty-seventh Day of February, 1990

Attest:

JEFFREY M. SAMUELS

Attesting Officer     Acting Commissioner of Patents and Trademarks